United States Patent [19]

Kosaka et al.

[11] 4,246,312

[45] Jan. 20, 1981

[54] THERMAL SENSITIVE PAPER MINIMIZED IN RELEASE OF TAILINGS LIABLE TO DEPOSIT ON THERMAL HEAD

[75] Inventors: Takao Kosaka; Yukio Tahara, both of Takasago, Japan

[73] Assignee: Mitsubishi Paper Mills, Ltd., Tokyo, Japan

[21] Appl. No.: 887,738

[22] Filed: Mar. 17, 1978

[30] Foreign Application Priority Data

Jul. 22, 1977 [JP] Japan ................................ 52-88118

[51] Int. Cl.³ .......................... B32B 5/16; B41M 5/18

[52] U.S. Cl. .................................... 428/207; 427/148; 427/151; 428/211; 428/329; 428/330; 428/331; 428/341; 428/913

[58] Field of Search ............... 428/328, 200, 307, 327, 428/411, 530, 537, 913, 914, 207, 211, 329, 331, 341; 427/150, 151, 148; 282/27.5; 260/39 P; 106/14.5, 21

[56] References Cited

U.S. PATENT DOCUMENTS

| | | | |
|---|---|---|---|
| 4,025,090 | 5/1977 | Petitpierre | 428/411 X |
| 4,168,845 | 9/1979 | Oeda et al. | 282/27.5 |

*Primary Examiner*—Thomas J. Herbert, Jr.
*Attorney, Agent, or Firm*—Cushman, Darby & Cushman

[57] ABSTRACT

A thermal sensitive paper having a heat sensitive layer containing a color-developing lactone compound and a phenol compound is amazingly lessened in release of tailings liable to deposit on the thermal head of a thermal printer, facsimile or such in the printing operation when a layer containing light calcium carbonate or an oil-absorptive inorganic powdery material is provided between the heat sensitive layer and the support.

14 Claims, No Drawings

THERMAL SENSITIVE PAPER MINIMIZED IN RELEASE OF TAILINGS LIABLE TO DEPOSIT ON THERMAL HEAD

This invention relates to an improvement on thermal sensitive color-forming paper, and more particularly to a thermal sensitive paper minimized in release of tailings which are liable to adhere and build up on the thermal head of a thermal printer, facsimile or such in its printing operation.

Thermal sensitive paper of the type in which the lactone dye and phenolic material contained therein are fused by heat of the thermal head to develop color is well known. In use of such thermal sensitive paper, however, the melt formed when color is developed tends to adhere to the thermal head, resulting in impaired printing quality. Such tendency is even promoted in use of thermal sensitive paper coated with wax for the purpose of preventing color formation by pressure or preventing chafing, fogging or scratching (such thermal sensitive paper is for instance disclosed in Japanese Patent Publication No. 14531/75). The problem becomes even more serious where printing is performed continuously for a long time as in printing operation with a thermal facsimile or thermal printer.

It has been generally practiced to add an organic or inorganic filler such as talc, clay, starch, etc., to the heat sensitive layer for preventing adhesion of the melt to the thermal head, but such means could not provide a satisfactory result.

In the course of further study on this subject, the present inventors found that a marvelous inhibitory effect against release and adhesion of tailings to the thermal head is provided without compromising the inherent properties of the thermal sensitive paper such as printing density if the paper support is overcoated with light calcium carbonate or an inorganic powdery material with oil absorption rate of over 50 ml/100 gr as measured according to JIS K-5101 method and the heat sensitive layer is overlaid thereon. Although the mechanism creditable with such surprising effect is not yet definitely known, it is considered that the oil-absorptive inorganic powdery material or light calcium carbonate overcoated on the support will instantaneously adsorb the oils which would become tailings from the melt comprising lactone dye, phenolic material and such in the paper coat to thereby minimize deposition of tailings on the thermal head when printing is carried out with the thermal head.

It was thus suggested to contain a material or materials with high oil absorptivity in the heat sensitive coat for preventing deposition of tailings, and the present inventors have already made a relevant proposal in their Japanese Patent Application No. 19333/77. These oil absorptive materials, however, involve some serious problems. That is, although effective in preventing deposition of tailings, such materials are usually bulky and also high in water absorptivity, so that when put into a heat sensitive coating solution, they might induce troubles such as change of solution properties. Also, presence of such material in the layer is apt to give adverse effect to color development. The present invention provides improvements on these matters, too.

It may be conceived as an effective measure to apply said material internally to the support. However, it is necessary for effective prevention of deposition of tailings that said material is present in an amount over a certain level on the support surface to which the heat sensitive layer adheres fastly, so that although a satisfactory effect can be obtained if said material is applied internally in a large amount, such internal application of a large amount of said material is undesirable as it might impair strength and other properties of the support.

The colorless or light-colored color-producing lactone compounds used in this invention are of commonly used type, and the following may be cited as typical examples: Crystal Violet lactone, Malachite Green lactone, 3,3-bis(paradimethylaminophenol)-4,5,6,7-tetrachlorophthalide, 3-ethylamino-6-chlorofluoran, 3-benzylamino-6-chlorofluoran, 3-cyclohexylamino-6-chlorofluoran, 3-morpholino-5,6-benzofluoran, 3-diethylamino-6-methyl-7-chlorofluoran, 3-diethylamino-7-chlorofluoran, 3-diethylamino-6,7-dimethylaminofluoran, 3-diethylamino-7,8-benzofluoran, 3-diethylamino-7-methoxyfluoran, 3-diethylamino-7-benzylaminofluoran, 3-diethylamino-7-anilinofluoran, 3-diethylamino-5,6-benzo-7-benzylaminofluoran, 3-diethylamino-6-methyl-7-anilinofluoran, 3-diethylamino-7-dibenzylamino-3',4',5',6'-tetrachlorofluoran, 3-ethyltriamino-6-methyl-7-anilinofluoran, 3-pyrrolidino-6-methyl-7-anilinofluoran, 3-diethylamino-7-{N-methyl-N-(3-trifluoromethylphenyl)amino}fluoran, and 3-diethylamino-7-(N-3'-trifluoromethylphenyl)aminofluoran.

The phenolic compounds used in this invention may be also of ordinary type but need be the ones which are liquefied or vaporized at a temperature of higher than 70° C. and reacted with said color-developing lactone compound to let it develop color. Preferred examples of such phenolic compounds are the ones having two or more hydroxyl groups in one molecule, such as 4,4'-isopropyridenephenol, 4,4'-isopropyridene-bis(2-chlorophenol), 4,4'-isopropyridene-bis(2-tert-butylphenol), 4,4'-sec-butylidenediphenol, 4,4'-cyclohexylidenediphenol, bisphenolsulfone, 4,4'-thiobis-(4-tert-butyl-3-methylphenol), 2,2'-bis-(4-hydroxyphenol)-n-heptane, novolak phenol resins, and halogenated novolak phenol resins. These materials were cited merely by way of example and not in a restrictive sense.

The wax used, if need be, in this invention for the purpose of preventing color formation by pressure in the heat sensitive layer or preventing scratches or such may be animal wax such as shellac wax like proposed in Japanese Patent Publication No. 14531/75, vegetable wax such as carnauba wax, petroleum wax such as paraffin, synthetic wax such as polyethylene wax, and other higher fatty acid amides. These waxes may be used either singly or in combination and in the form of fine powder or emulsion.

There may be used ordinary type of adhesives for the heat sensitive layer in this invention, but it is preferred to use the water-soluble high molecular adhesives rather than the heat-fusible ones. Preferred examples of such additives include starch, polyvinyl alcohol, carboxymethyl cellulose, methyl vinyl ether-maleic acid copolymers, hydroxyethyl cellulose, casein, gelatin, and gum arabic.

It is also possible to add a brightener, filler and/or the like such as talc, clay, starch grains, etc., in the heat sensitive coating solution.

If desired, other additives serviceable as sensitivity improver, such as disclosed in Japanese Patent Pub. No. 4160/68, Japanese Pat. Laid-Open No. 19231/73 and Japanese Pat. Laid-Open No. 58842/74, may be added for minimizing power consumption or for increasing printing speed in a thermal facsimile, thermal printer or such.

The heat sensitive coating layer used in this invention may be formed according to a normal method by mixing a color-developing lactone compound, phenolic compound, water-soluble high-molecular adhesive and, if need be, a sensitivity improver, wax, surface active agent and/or the like in an aqueous medium, pulverizing said materials by a pulverizer such as ball mill to as much small size as possible, preferably less than 5μ, and applying the thus prepared heat sensitive coating solution on the support.

Paper is usually used for the support, but synthetic resin film, or woven or non-woven fabric sheet may as well be used. When applying the heat sensitive coating solution, it is recommended to use a suitable coater head such as air knife, rubber doctor, steel blade, roll or Meyer bar and to dry the coating at a relatively low temperature. Since mere application of the coating solution does not provide a good surface condition, the coating is usually subjected to a surface treatment by a calender or other means to improve the coating surface smoothness.

The inorganic powder materials with oil absorption of over 50 ml/100 gr (as measured according to JIS K-5101 method), which are used in this invention, generally have a salient effect for preventing deposition of tailings, but most preferred among these materials are the ones prepared by acid-treating the base earth material containing montmorillonite, bentonite, kaolin or such in the form of activated clay, various kinds of calcined kaolins obtained by calcining kaolin ores, and finely powdered silicic acids with $SiO_2$ content of over 80% (by weight) or finely powdered aluminum oxide with $Al_2O_3$ content of over 80% (by weight), which are usually used as rubber filler or coating material.

The "light calcium carbonate" used in this invention is precipitated calcium carbonate produced by a chemical process. It is more uniform in particle size distribution than heavy calcium carbonate obtained by mechanically pulverizing lime stone and has average particle size of 0.2 to 1.5μ. It is preferred to use the one with a large apparent volume and a large bulk. For effectively performing overcoating of an inorganic powdery material with oil absorption of over 50 ml/100 gr, light calcium carbonate or a mixture thereof on a support according to this invention, said material is dispersed in an aqueous medium, if need be, with the aid of a dispersant such as a phosphate and/or a surface active agent to prepare an aqueous coating solution added with an adhesive and such solution is applied on the base paper surface over a paper making machine. Such application is usually practiced at the portion of the paper making machine where the solution is overcoated on the paper surface, such as sizing press portion, but it may be accomplished by using a coating machine having a coater head such as steel blade, air knife, roll, flexo, Meyer bar or such. A sizing agent may be introduced into the solution when the coating operation is performed at the sizing press portion of the paper making machine.

As for coating build-up of the inorganic powdery material, it sufficies if the heat sensitive coating is given in an amount of more than 1.0 g/m$^2$ on the paper surface. No satisfactory effect is provided if said amount is less than 1.0 g/m$^2$. The greater the amount of said coating material is, the higher is the effect provided, but too much build-up of the material causes poor workability at the coating operation and may also impair strength and other properties of the support. Therefore, it is recommended to set the upper limit at 6 g/m$^2$.

"Oil absorption" according to JIS K-5101 method is determined in the following way. 1 to 5 gr of specimen is spread on a glass plate (measuring approximately 250×250×5 mm) and boiled linseed oil is dropped portionwise from a buret to the center of the specimen, the entire material being kneaded sufficiently with a spatula upon each dropping. Such dropping and kneading operation is repeated until the entire material becomes a solid putty-like mass that can be helically dragged up with a steel spatula. At this point, the oil absorption G is determined from the amount of boiled linseed oil used according to the following formula:

$$G=(H/S)\times 100$$

Where H=amount of linseed oil used (ml)
S=specimen weight (g)

In the case of the material which can not be formed into a volute but is suddenly softened upon addition of a drop of boiled linseed oil (as experienced when using certain kinds of pigment), the moment before the material sticks to the glass plate is considered as end point, and the above-said calculation is made at this point.

The invention is now described in further detail by way of some examples. It is to be understood, however, that the scope of this invention is not limited by these examples. In the description of the following examples, "build-up of tailings" is the length of the deposit on the thermal head after 100 meter printing on a thermal sensitive paper roll. In actual use, it is desirable that such build-up of tailings will not exceed 2 mm.

"Deposition of tailings" in Table 1 designates the condition of deposition of tailings on the thermal head, where ◯ mark indicates almost no deposition of tailings, allowing continuation of normal printing operation, while X mark indicates too much deposition of tailings for continuing normal printing operation.

EXAMPLE 1

The following materials:

| | |
|---|---|
| Water | 150 weight parts |
| Ansilex (calcined kaolin mfd. by Engelhard Corp.) | 100 weight parts |
| Dow-636 (SBR latex by Asahi-Dow Chemicals) | 20 weight parts |
| 15% solution of MS-3800 (oxidized starch mfd. by Nippon Foods | 100 weight parts |

were stirred and dispersed sufficiently by a stirrer to prepare an overcoating solution, and this overcoating solution was applied on the paper surface to provide spread of 5 g/m$^2$ (by absolute dry weight) at the sizing press portion of a paper making machine designed for producing 40 g/m$^2$ fine-quality paper.

In the meanwhile, the following two solutions A and B:

| | | |
|---|---|---|
| Solution A | Crystal Violet lactone | 1 weight part |
| | 5% aqueous solution of hydroxyethyl cellulose | 5 weight parts |
| Solution B | 4,4'-isopropyridenediphenol | 1 weight part |

-continued

| | |
|---|---|
| 5% aqueous solution of hydroxyethyl cellulose | 5 weight parts |

were separately crushed by a ball mill for 2 days and mixed in the A:B ratio of 1:5 (by weight) to prepare a heat sensitive coating solution.

This heat sensitive coating solution was spread on said overcoated paper surface by using an air knife coater to provide coating build-up of 5 g/m$^2$ (by absolute dry weight) and dried at a temperature controlled to stay below 60° C. The coating was further subjected to a super calender to finish into Bekk smoothness of 200 to 300 seconds, and after forming 180 mm wide slits by a slitter, the paper was formed into a 100-meter roll. Said heat sensitive coating solution was also applied on a non-overcoated paper and the latter was similarly formed into a roll of the same length. These two rolls of paper were then subjected to 100 meter printing with Toshiba Thermal Facsimile FAXKB-500 at main scanning speed of 500 lpm and recording voltage of 20 V by using the Visual Electronic Society Standard Chart No. 2, and thereafter the thermal head of the facsimile was examined. It was found that the overcoated paper caused only 0.4 to 0.7 mm long deposition of tailings, which induced no trouble but mere clouding of the head, while the non-overcoated paper caused 3 to 4 mm long deposition of tailings.

EXAMPLE 2

| | |
|---|---|
| Hakuenka PC (light calcium carbonate mfd. by Shiraishi Calcium Co.) | 100 weight parts |
| Sodium hexametaphosphate | 0.5 weight parts |
| Water | 150 weight parts |

These materials were sufficiently stirred and dispersed by using a stirrer and then further added with 100 weight parts of a 15% polyvinyl alcohol solution to prepare an overcoating solution, and this solution was spread on 40 g/m$^2$ fine-quality paper by an air knife coater to form 6 g/m$^2$ of coating build-up.

On the other hand, the following three solutions A, B and C:

| | | |
|---|---|---|
| Solution A | 3-piperidino-6-methyl-7-anilinofluoran | 1 weight part |
| | 5% aqueous solution of hydroxyethyl cellulose | 5 weight parts |
| Solution B | 4,4'-isopropyridene-diphenol | 1 weight part |
| | 5% aqueous solution of hydroxyethyl cellulose | 5 weight parts |
| Solution C | Fatty Acid Amide S (stearic acid amide by Nitto Chemicals) | 1 weight part |
| | 5% aqueous solution of hydroxyethyl cellulose | 5 weight parts |

were separately crushed by a ball mill for two days and then mixed in the A:B:C ratio (by weight) of 1:5:3 to prepare a heat sensitive coating solution, and this solution was applied to the above-said overcoated paper as well as to a non-overcoated paper, said both papers being then calendered, rolled and subjected to a facsimile test as the manner of Example 1. As a result, the overcoated paper caused only 0.8 to 1.2 mm long deposition of tailings on the thermal head while the non overcoated paper caused 5 to 6 mm long deposition of tailings.

EXAMPLE 3

The same test was carried out by using various kinds of inorganic and organic powdery materials instead of Hakuenka PC in Example 2, obtaining the results shown in Table 1 below.

TABLE 1

| | Name | Component | Oil absorption ml/100 g | Build-up of tailings | Deposition of tailings |
|---|---|---|---|---|---|
| This invention | Hakuenka PC | Light calcium carbonate with average particle size of 1.4 μ by Shiraishi Calcium Co. | | 0.8-1.2 mm | ○ |
| This invention | Hakuenka PZ | Light calcium carbonate with average particle size of 0.2 μ by Shiraishi Calcium Co. | | " | ○ |
| This invention | Mizukasil | Finely powdered silicic acid by Mizusawa Chemicals | 260 | " | ◎ |
| This invention | Ansilex | Calcined kaolin by Engelhard | 70-80 | " | ◎ |
| This invention | Silica F-144 | Finely powdered silicic acid by Japan Aerosil | 310 | " | ◎ |
| This invention | Silton | Activated clay by Mizusawa Chemicals | 70-80 | " | ◎ |
| This invention | "Kesif" | Finely powdered aluminum oxide by Kyowa Chemicals | 120 | " | ○ |
| Outside this invention | None | | | 5-6 mm | X |
| Outside this invention | Ultracoat | Kaolin by Engelhard Corp. | 45 | " | X |
| Outside this invention | Zieklite | Clay by Zieklite Inc. | 45 | " | X |
| Outside this invention | Talc | | 30 | " | X |
| Outside this invention | Rice starch | | 65 | " | X |

TABLE 1-continued

| | Name | Component | Oil absorption ml/100 g | Build-up of tailings | Deposition of tailings |
|---|---|---|---|---|---|
| Outside this invention | KC Flock | Fine cellulose powder by Sanyo Kokusaku Co. | 170 | " | X |
| Outside this invention | Whiton | Heavy calcium carbonate by Shiraishi Calcium Co. | | " | X |

As apparent from Table 1, the thermal sensitive paper prepared by overcoating the support with an inorganic powdery material with oil absorption of over 50 ml/100 g (as measured according to JIS K-5101 method) or light calcium carbonate and then applying a heat sensitive layer thereon is amazingly improved in preventing deposition of tailings to the thermal head.

EXAMPLE 4

An overcoating solution obtained in the same way as Example 1 except for use of a mixture of 50 weight parts of Ansilex and 50 weight parts of Hakuenka PC instead of 100 weight parts of Ansilex was applied on 40 g/$m^2$ fine-quality paper at the sizing press portion of a paper making machine such that the spread of said overcoating solution (by absolute dry weight) would be 5 g/$m^2$ and then a heat sensitive coating solution same as used in Example 2 was applied on the thus treated support to thereby obtain a thermal sensitive paper. Build-up of tailings to the thermal head in use of this thermal sensitive paper was 0.8 to 1.2 mm.

What is claimed is:

1. A thermal sensitive paper comprising a support and a heat sensitive layer containing a color-developing lactone compound and a phenol compound, characterized in that a layer formed from at least 1.0 g/$m^2$, of a member of the group consisting of light calcium carbonate, an inorganic powdery material with oil absorption of over 50 ml/100 gr as measured according to JIS K-5101 method and a mixture of said light calcium carbonate and said inorganic powdery material is provided between said support and said heat sensitive layer for preventing deposition of tailings to the thermal head.

2. A thermal sensitive paper of claim 1, wherein the spread of said material for preventing deposition of tailings to the thermal head is within the range of 1.0 to 6 g/$m^2$.

3. A thermal sensitive paper of claim 1, wherein the average particle size of light calcium carbonate is within the range of 0.2 to 1.5$\mu$.

4. A thermal sensitive paper of claim 1, wherein the inorganic powdery material is at least one member selected from the group consisting of activated clay, calcined kaolin, aluminum oxide with $Al_2O_3$ content of at least 80 weight % and inorganic silicic acid with $SiO_2$ content of at least 80 weight %.

5. A thermal sensitive paper of claim 1, wherein the heat sensitive layer contains a water-soluble high-molecular adhesive.

6. A thermal sensitive paper according to claim 1 wherein said layer between said support and said heat sensitive layer contains calcium carbonate.

7. A thermal sensitive paper according to claim 1 wherein said layer between said support and said heat sensitive layer contains said inorganic powdery material with oil absorption of over 50 ml/100 gr and is free from light calcium carbonate.

8. A thermal sensitive paper according to claim 7 wherein the spread of said material for preventing deposition of tailings to the thermal head is within the range of 1.0 to 6 g/$m^2$.

9. A thermal sensitive paper according to claim 7 wherein the heat sensitive layer contains a water-soluble high molecular weight adhesive.

10. A thermal sensitive paper according to claim 7 wherein the inorganic powdery material is at least one member selected from the group consisting of activated clay, calcined kaolin, aluminum oxide with $Al_2O_3$ content of at least 80 weight % and inorganic silicic acid with $SiO_2$ content of at least 80 weight %.

11. A thermal sensitive paper according to claim 10 wherein said inorganic powdery material is activated clay.

12. A thermal sensitive paper according to claim 10 wherein said inorganic powdery material is aluminum oxide with $Al_2O_3$ content of at least 80 weight %.

13. A thermal sensitive paper according to claim 10 wherein said inorganic powdery material is inorganic silicic acid with $SiO_2$ content of at least 80 weight %.

14. A thermal sensitive paper comprising a support and a heat sensitive layer containing a color-developing lactone compound and a phenol compound, characterized in that a layer formed from at least 1.0 g/$m^2$, of a member of the group consisting of light calcium carbonate, calcined kaolin with oil absorption of over 50 ml/100 gr as measured according to JIS K-5101 method and a mixture of said light calcium carbonate and said calcined kaolin is provided between said support and said heat sensitive layer for preventing deposition of tailings to the thermal head.

* * * * *